(12) United States Patent
Barton et al.

(10) Patent No.: US 8,078,694 B2
(45) Date of Patent: Dec. 13, 2011

(54) BROWSER-BASED PROXY SERVER FOR CUSTOMIZATION AND DISTRIBUTION OF EXISTING APPLICATIONS

(75) Inventors: John Joseph Barton, Los Gatos, CA (US); Zhigang Hua, Atlanta, GA (US); Jeffrey William Nichols, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 12/131,080

(22) Filed: May 31, 2008

(65) Prior Publication Data

US 2009/0182844 A1 Jul. 16, 2009

Related U.S. Application Data

(63) Continuation of application No. 12/013,559, filed on Jan. 14, 2008, now Pat. No. 7,664,862.

(51) Int. Cl.
*G06F 15/16* (2006.01)

(52) U.S. Cl. ........ 709/219; 709/217; 709/227; 709/238; 709/246

(58) Field of Classification Search .................. 719/310, 719/313, 317, 328; 709/217, 227, 238, 246
See application file for complete search history.

(56) References Cited

U.S. PATENT DOCUMENTS

| | | | |
|---|---|---|---|
| 5,727,159 A | 3/1998 | Kikinis | |
| 5,918,013 A | 6/1999 | Mighdoll et al. | |
| 6,049,821 A * | 4/2000 | Theriault et al. | 709/203 |
| 6,738,803 B1 | 5/2004 | Dodrill et al. | |
| 6,829,746 B1 | 12/2004 | Schwerdtfeger et al. | |
| 6,880,014 B2 * | 4/2005 | Brown et al. | 709/227 |
| 6,912,691 B1 | 6/2005 | Dodrill et al. | |
| 6,944,665 B2 * | 9/2005 | Brown et al. | 709/227 |
| 6,970,918 B2 * | 11/2005 | Brown et al. | 709/219 |
| 7,200,644 B1 * | 4/2007 | Flanagan | 709/219 |
| 7,234,107 B1 | 6/2007 | Aoki et al. | |
| 7,424,459 B2 | 9/2008 | Bodmer et al. | |
| 7,664,862 B2 * | 2/2010 | Barton et al. | 709/227 |
| 2002/0026507 A1 | 2/2002 | Sears et al. | |
| 2003/0061386 A1 * | 3/2003 | Brown et al. | 709/246 |
| 2003/0061387 A1 * | 3/2003 | Brown et al. | 709/246 |
| 2004/0183817 A1 * | 9/2004 | Kaasila | 345/660 |
| 2004/0193699 A1 | 9/2004 | Heymann et al. | |
| 2007/0240063 A1 | 10/2007 | Cheng et al. | |

(Continued)

OTHER PUBLICATIONS

Wu et al., "Remixing the Web: Tailoring Applications Using Programmable Proxies inside Web Browsers", Stanford University HCI Group, Computer Science Department. Mar. 10, 2007.*
Sommermeyer, "Search Report and Written Opinion", European Patent Office, Jan. 4, 2009.

(Continued)

*Primary Examiner* — David Lazaro
*Assistant Examiner* — Vitali Korobov
(74) *Attorney, Agent, or Firm* — Cantor Colburn LLP; Mohammed Kashef

(57) ABSTRACT

A system, method and computer program product for executing at least one client computer software application by embedding a web browser in a proxy server, thereby forming a proxy browser. The proxy browser is used to execute the application inside the proxy server. In one embodiment of the invention, each client browser that connects to the proxy server is assigned an instance of the proxy browser and session information is maintained for the client browser. When the client browser makes a request to the proxy server, the request is linked to the instance of the proxy browser.

11 Claims, 3 Drawing Sheets

U.S. PATENT DOCUMENTS

| | | |
|---|---|---|
| 2008/0005282 A1 | 1/2008 | Gaedcke |
| 2008/0077980 A1 | 3/2008 | Meyer et al. |
| 2008/0077983 A1 | 3/2008 | Meyer et al. |
| 2008/0275980 A1 | 11/2008 | Hansen |

OTHER PUBLICATIONS

Wu et al., "Remixing the Web: Tailoring Applications Using Programmable Proxies inside Web Browsers", Stanford University HCI Group, Computer Science Department.

Malandrino et al., "Tackling Web Dynamics By Programmable Proxies", ISIS Lab, Sciencedirect.com, available online Dec. 20, 2005.

Wolfgang Stuerzlinger et al., "User interface facades: towards fully adaptable user interfaces," In Proceedings of UIST 2006. Montreux, Switzerland. pp. 309-318.

Desney Tan, "WinCuts: Manipulating Arbitrary Window Regions for More Effective Use of Screen Size," In Extended Proceedings of CHI 2004. Vienna, Austria. pp. 1525-1528.

* cited by examiner

BROWSER-BASED PROXY SERVER FOR CUSTOMIZATION AND DISTRIBUTION OF EXISTING APPLICATIONS

RELATED APPLICATIONS

This application is a continuation application of and claims priority to application Ser. No. 12/013,559, filed Jan. 14, 2008, which is currently pending, and which is hereby incorporated by reference in its entirety as if fully set forth.

FIELD OF INVENTION

The present invention generally relates to proxy servers, and particularly to systems and methods for using a proxy server to enable devices with limited capabilities to support dynamic web applications.

BACKGROUND

Web applications are used for most client/server interactions using the internet. In web applications, some or all of the application is downloaded from the Web each time it is run, typically using web browsers and Java applets. More recently, dynamic web applications, such as those found in many Web 2.0 applications, have brought new kinds of dynamic and interactive elements to a user's web experience. These applications generally involve the use of client-side scripting in a standard language such as JavaScript.

There has also recently been a proliferation of electronic devices having improved functionality, such as mobile phones, person digital assistants (PDAs), television set-top boxes, and others. However, these kinds of devices are often not able to take full advantage of dynamic web applications for various reasons, such as limited screen real-estate, format compatibility, limited computing capabilities, or an inability to support JavaScript. Hence, there is a need for ways to adapt existing dynamic web applications for use on such devices.

In addition, there is a need to be able to customize dynamic web applications for particular users, groups of users, or particular tasks. Proxy server-based technologies have been discussed as possible solutions to provide these types of customizations on the web. However, proxy server technologies generally do work well with Web 2.0 applications. This is because either 1) the JavaScript code implementing the dynamic functionality of a Web 2.0 application is not passed through the proxy server or 2) some elements of the web page's Document Object Model (DOM) that the script expects may be removed by the proxy server.

One approach to add additional functionality to devices is to employ proxy servers to translate client requests and/or server responses. U.S. Pat. No. 5,727,159 describes a proxy server for translating content into a form that is usable by low power portable computers. U.S. Pat. Nos. 5,918,013 and 6,829,746 describe technologies for transcoding documents from an existing format to another format more suitable for the specific situation, such as into another language for a foreign speaker, onto a mobile device with different display requirements, or into a format with larger buttons that might be more accessible for an impaired user. Unfortunately, these technologies also have the problem described above in that they cannot appropriately deal with dynamic content. This is primarily because these technologies cannot execute client-side scripts and maintain sufficient state information about each client.

The use remote desktop technology is another existing technology that might be used to permit devices with limited functionality to use dynamic web applications. Examples of remote desktop technology include Microsoft's Remote Desktop, XWindows, or AT&T's VNC, which can be used to view the output of a web browser from a server machine on a client device. Although these technologies are limited to showing the exact pixels from the server machine, there has been some work on customization. Examples include Wincuts or User Interface Facades. These customizations could, for example, display a subset of buttons from the original interface in the remotely viewed interface. Unlike other proxy server approaches, this approach can deal with client-side JavaScript because a real web browser is being used on the server machine. However, these technologies are still limited by their reliance on images of the server machine. For example, it is difficult, if not impossible, to change the labels on buttons. The input and output capabilities of the server machine and the client machine must also be similar, because the user on the client machine must be able to provide inputs that the server machine would expect, such as pointing and clicking at buttons or dragging a scrollbar.

Accordingly, there is a need for a way to enable devices with limited capabilities to appropriately deal with dynamic web applications. There is also a need for proxy servers that can execute client-side scripts and maintain sufficient state information about each client.

SUMMARY OF THE INVENTION

To overcome the limitations in the prior art briefly described above, the present invention provides a method, computer program product, and system for customization and distribution of dynamic web applications using a browser-based proxy server.

In one embodiment of the present invention, a method for executing at least one client computer software application comprises: embedding a web browser in a proxy server, thereby forming a proxy browser; and using the proxy browser to execute the application inside the proxy server.

In another embodiment of the present invention, a method of embedding a web browser in a proxy server comprises: placing the web browser in the proxy server, thereby forming a proxy browser; logically connecting within the proxy server an event translator to the proxy browser; and logically interfacing a transcoder within the proxy server to the proxy browser and to the event translator.

In another embodiment of the present invention, a method of providing access to web applications comprises: receiving a request from a client browser by a proxy browser contained within a proxy server; translating the request into an operation; applying the operation to a web page within the proxy browser; extracting relevant portions of the web page; and generating an output using the extracted relevant portions of the web page, the output being readable by the client browser.

In an additional embodiment of the present invention a proxy server comprises: a proxy browser coupled to an external web server; an event translator for receiving requests from a client browser; and a transcoder for extracting relevant portions of content received from the external web server by the proxy browser and generating an output that is sent to the client browser.

In a further embodiment of the present invention, a computer program product comprises a computer usable medium having a computer readable program, wherein the computer readable program when executed on a computer causes the computer to: embed a web browser in a proxy server, thereby forming a proxy browser; and use the proxy browser to execute a client application inside the proxy server.

Various advantages and features of novelty, which characterize the present invention, are pointed out with particularity in the claims annexed hereto and form a part hereof. However, for a better understanding of the invention and its advantages, reference should be made to the accompanying descriptive matter together with the corresponding drawings which form a further part hereof, in which there are described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

Figure 1:
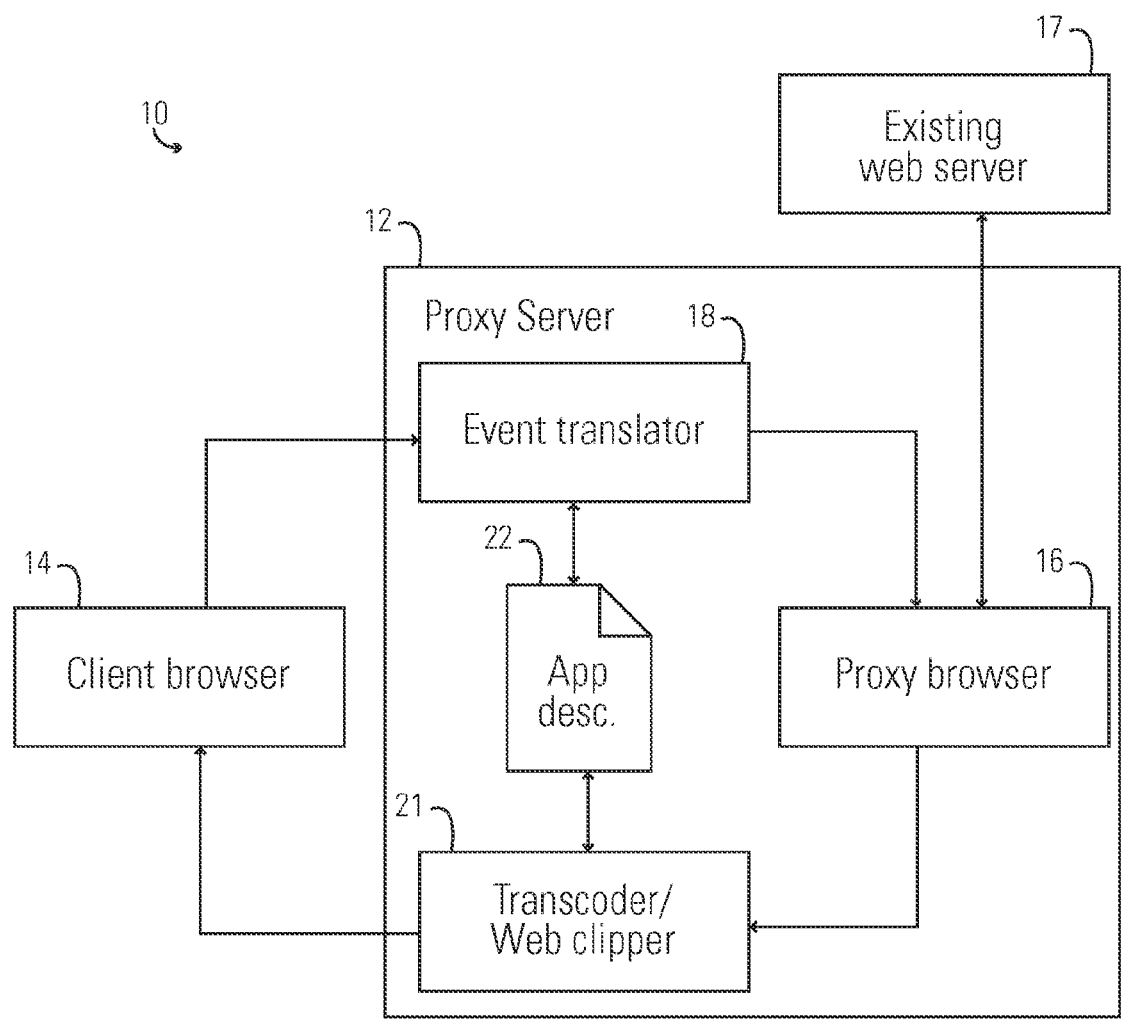
FIG. 1 shows a conceptual block diagram of a browser-based proxy server system in accordance with an embodiment of the present invention.

The present invention overcomes the problems associated with the prior art by teaching a system, computer program product, and method for enabling devices with limited functionality to handle dynamic web applications. Embodiments of the invention place a web browser inside the proxy server, known as the proxy browser, and use it to execute client-side applications, such as JavaScript code, inside the proxy server. Each client browser that connects to the proxy server is given its own proxy browser instance and session information is maintained so that future requests from a client browser can be linked to the appropriate proxy browser. The first request by a client browser causes the corresponding proxy browser to open a web page, execute any client-side code (such as JavaScript) embedded in the existing web page, and then return a portion of the final page contents to the client browser. The proxy browser provides an application program interface (API), such as DOM, to access, manipulate, and control the web page appearing in the browser. Future requests by the client browser are translated into operations to perform on the page currently open by the proxy browser. These operations may include clicking on a DOM object in the page or submitting a form. When the proxy browser finishes loading the page, it again returns a portion of the final page contents to the client browser.

As a result, embodiments of the invention have some significant advantages over existing technologies. Previous proxy servers have used a map-style system, where typically URLs are mapped to the code that modifies the page. Every time the client requests a page, the server gets the content from the external page, looks up the code to modify that page, executes it, and returns the modified page. The path that the user took to get to that page is irrelevant. The present invention employs a description language which describes the possible interaction paths that a user might take through the application, including the inputs the user may make and the possible outputs for those inputs. This allows the application description to support dynamic content from Web 2.0 applications, because client requests can be translated into simulated mouse and keyboard events in the proxy browser. Also, new output can be generated from portions of the page that have been changed by XmlHttpRequests instead of just new page requests.

Embodiments of the present invention may be used for many different purposes. For example, the present invention may be used to move selected pieces of an electronic medical records (EMR) application, such as patient scheduling or an overview of medical history, to a mobile device that doctors can carry with them. Also, embodiments of the present invention may be used to adapt a travel planning application for executives and their assistants so that the assistants would receive an interface for scheduling new trips and executives would receive an interface for confirming reservations and getting updated itineraries on the road. Another use for the present invention may be to customize the long and tedious checkout process that may be found in business web-based purchasing systems. The present invention may enable a simpler process, for example, by showing only the fields that need to be changed by that user from purchase to purchase.

Referring now to FIG. 1, a browser-based proxy server system 10 is shown, which includes a proxy server 12 and a client browser 14. The proxy server 12 includes a proxy browser 16, an event translator 18, and a transcoder/web clipper 20. The proxy browser 16 is connected to an existing web server 17. The proxy browser 16 may be a standard web browser and may implement an execution engine (not shown) compatible with code embedded in an existing web page. In some embodiments, this may be a JavaScript execution engine. The proxy browser 16 may also provide an API to access, manipulate, and control the web page appearing in the browser. In some embodiments, this may include generating a DOM tree description of the web page currently being displayed. In one embodiment, the Mozilla Firefox browser may be used, but in principle any modern browser that allows add-on code to access the web page data structures may be used.

The event translator 18 takes requests from the client browser 14 and translates them into operations to be applied to the web page that is currently contained within the proxy browser 16. These operations could range from the simple, such as clicking a link, to more complex behaviors, such as filling in a form and pressing a submit button.

The transcoder/web clipper 20 determines when the proxy browser 16 has finished loading its new content. This may be done through an onLoad event. The transcoder/web clipper 20 also extracts the relevant portions of the content and generates output that is sent back to the client browser 14. The output can range from static HTML pages for low-functionality devices to fully dynamic pages with Cascading Style Sheets (CSS), Dynamic HTML (DHTML), and JavaScript for high-functionality devices. Note that the generated page will be created such that any requests back to the proxy server 12 will be interpretable by the event translator 18.

The operations of the proxy browser 16, the event translator 18, and the transcoder/web clipper 20 are tied together by an application description component 22, which specifies how a set of existing web pages are modified for the client browser 14 and what means are available in the client browser for navigating between the pages.

In the present embodiment, the application description 22 consists of a set of modified web pages generated by the proxy server 12. These modified web pages are referred to as "pagelets". Each pagelet describes one page that may be seen by the client browser. Pagelets are defined in the application description by three different scripts: the clip script, the event script, and the load script.

Figure 2:
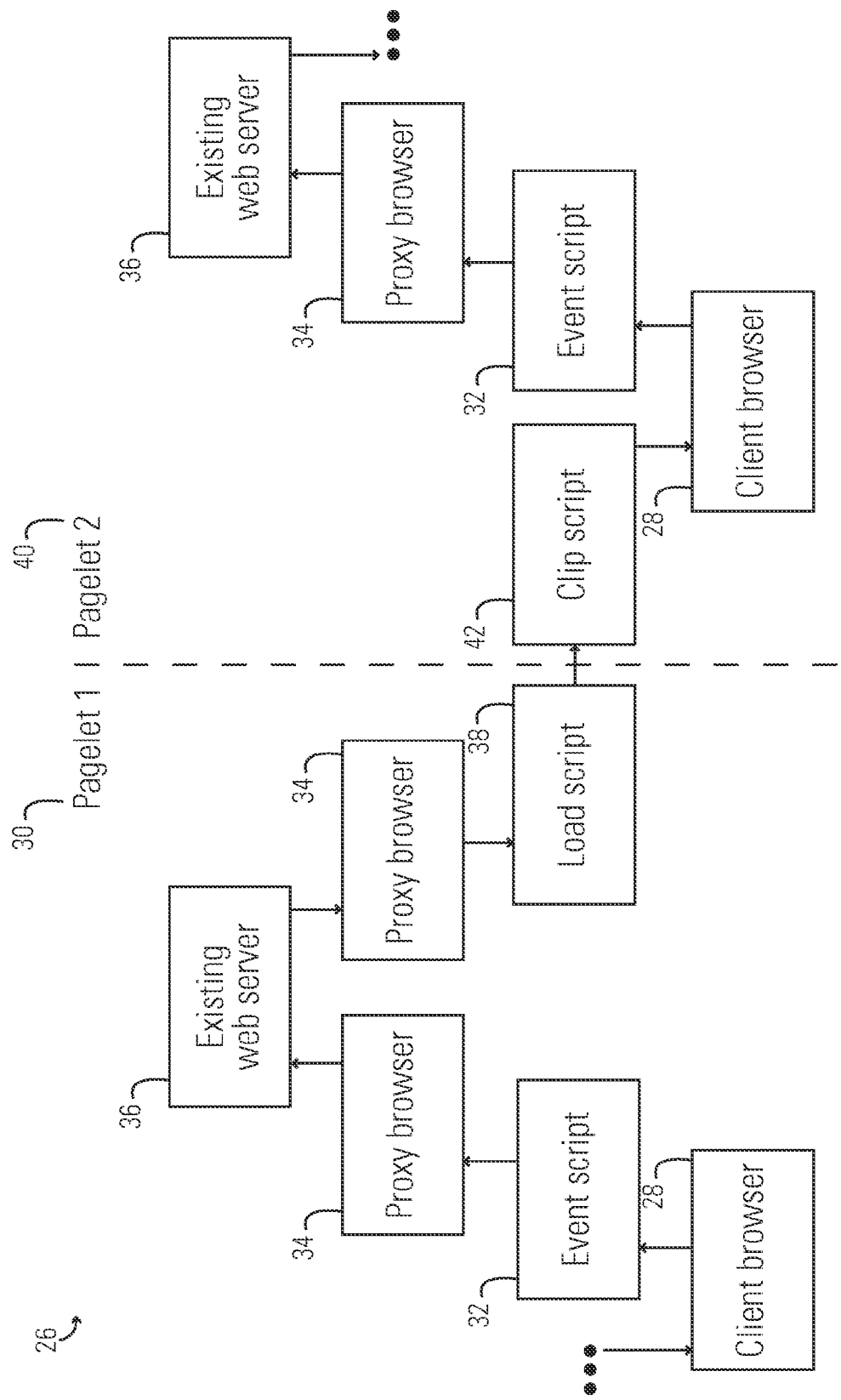
FIG. 2 shows a timeline of a process for customization and distribution of dynamic web applications using the system shown in FIG. 1 in accordance with an embodiment of the present invention.

Referring now to FIG. 2, a timeline of one embodiment of the browser-based proxy server system 10 is shown. In particular, this timeline 26 shows how the proxy server 12 processes requests using scripts from the application description 22. In particular, a client browser 28 generates a request that is received by the proxy server 12. The client browser 28 may reside in a mobile device or other device with limited functionality. In response to a request from the client browser, the proxy browser 34 opens a web page that it receives from an external existing web server.

The application description 22 defines a first pagelet 30 and uses an event script 32, which interprets requests from the client browser 28 to determine which set of operations from the application description 22 should be executed in the proxy browser 34 to generate a second pagelet 40. These operations may not be encoded within the request. Instead the request may comprise a pointer to a list of operations that are stored on the proxy server 12. Such operations could include clicking a link in the client browser 28 or filling in a form and pressing the submit button. The event script 32 also identifies an appropriate browser event that will occur after the proxy browser 34 has finished loading any new content received from the existing web server 36. The event script 32 also causes a load script 38 to be executed when this event occurs next.

The load script 38 scans the content of the page loaded in the proxy browser 34 and determines the next pagelet, such as a second pagelet 40. Once the second pagelet 40 is determined, a clip script 42 for the second pagelet 40 is called to generate the content that will be sent to the client browser 28.

In particular, the clip script specifies how to create the content of the pagelet that will be sent to the client browser. Content creation primarily involves selecting and extracting elements from the page loaded in the proxy browser 34 and combining them together to make a single coherent page. A clip script 42 may also insert new content. The clip script 42 may also re-write links and forms to point back to the proxy server 34 rather than to the external existing web server 36. The process 26 shown in FIG. 2 may then be repeated indefinitely.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, or an optical disk. Current examples of optical disks include compact disk-read-only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Figure 3:
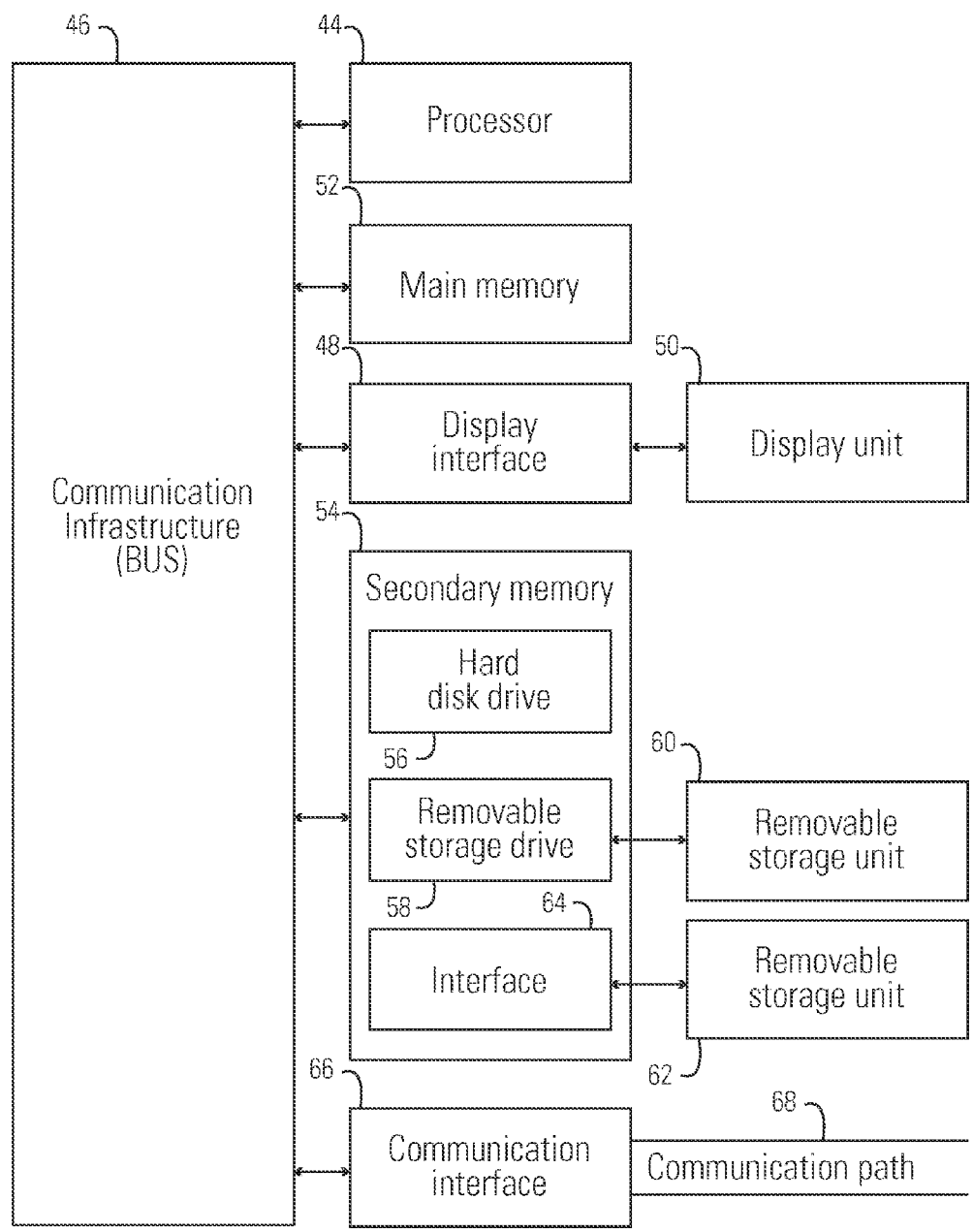
FIG. 3 shows a high level block diagram of an information processing system useful for implementing one embodiment of the present invention.

FIG. 3 is a high level block diagram showing an information processing system useful for implementing one embodiment of the present invention. The computer system includes one or more processors, such as processor 44. The processor 44 is connected to a communication infrastructure 46 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 48 that forwards graphics, text, and other data from the communication infrastructure 46 (or from a frame buffer not shown) for display on a display unit 50. The computer system also includes a main memory 52, preferably random access memory (RAM), and may also include a secondary memory 54. The secondary memory 54 may include, for example, a hard disk drive 56 and/or a removable storage drive 58, representing, for example, a floppy disk drive, a magnetic tape drive, or an optical disk drive. The removable storage drive 58 reads from and/or writes to a removable storage unit 60 in a manner well known to those having ordinary skill in the art. Removable storage unit 60 represents, for example, a floppy disk, a compact disc, a magnetic tape, or an optical disk, etc. which is read by and written to by removable storage drive 58. As will be appreciated, the removable storage unit 60 includes a computer readable medium having stored therein computer software and/or data.

In alternative embodiments, the secondary memory 54 may include other similar means for allowing computer programs or other instructions to be loaded into the computer system. Such means may include, for example, a removable storage unit 62 and an interface 64. Examples of such means may include a program cartridge and cartridge interface (such as that found in video game devices), a removable memory chip (such as an EPROM, or PROM) and associated socket, and other removable storage units 62 and interfaces 64 which allow software and data to be transferred from the removable storage unit 62 to the computer system.

The computer system may also include a communications interface 66. Communications interface 66 allows software and data to be transferred between the computer system and external devices. Examples of communications interface 66 may include a modem, a network interface (such as an Ethernet card), a communications port, or a PCMCIA slot and card, etc. Software and data transferred via communications interface 66 are in the form of signals which may be, for example, electronic, electromagnetic, optical, or other signals capable of being received by communications interface 66. These signals are provided to communications interface 66 via a communications path (i.e., channel) 68. This channel 68 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 52 and secondary memory 54, removable storage drive 58, and a hard disk installed in hard disk drive 56.

Computer programs (also called computer control logic) are stored in main memory 52 and/or secondary memory 54. Computer programs may also be received via communications interface 66. Such computer programs, when executed, enable the computer system to perform the features of the present invention as discussed herein. In particular, the computer programs, when executed, enable the processor 44 to perform the features of the computer system. Accordingly, such computer programs represent controllers of the computer system.

From the above description, it can be seen that the present invention provides a system, computer program product, and method for customization and distribution of dynamic web applications using a browser-based proxy server. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiments of the present invention have been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method of executing at least one client computer software application comprising:
    embedding a web browser in a proxy server, thereby forming a proxy browser;
    using said proxy browser to execute said application inside said proxy server;
    connecting at least one client browser to said proxy server;
    assigning each client browser that connects to said proxy server an instance of said proxy browser;
    maintaining session information for said client browser;
    if said client browser makes a request to said proxy server, linking said request to said instance of said proxy browser;
    wherein said proxy browser in said proxy server is distinct from said client browser in a client device;
    responsive to said proxy browser in said proxy server receiving a purchase process from a business system on behalf of said client browser in said client device, said proxy browser not displaying the multistage purchase process to said client browser for a user, but said proxy browser only displaying changes that are needed in fields to said client browser in which said changes are said fields that said user needs to alter from purchase to purchase; and
    responsive to said proxy browser determining possible interaction paths that said user might take through said client application as inputs and responsive to said proxy browser determining possible outputs to said inputs, translating said request into simulated mouse events and simulated keyboard events by the proxy browser;
    wherein translating said request into said simulated mouse events and said simulated keyboard events by said proxy browser comprises said proxy browser clicking a link and pressing a submit button.

2. The method of claim 1 wherein said linking comprises, if said request is a first request by said client browser:
    opening a web page via said proxy browser;
    executing said client application on said web page; and
    returning a portion of the contents of said page resulting from said executing to said client browser.

3. The method of claim 2 wherein said executing comprises, if said request is not a first request by said client browser, translating said request into operations to perform on said web page.

4. The method of claim 2 wherein said returning comprises creating a modified web page.

5. The method of claim 4 wherein said creating comprises:
    extracting elements from said web page; and
    combining said elements into said modified web page.

6. The method of claim 4 wherein said creating comprises inserting new content in said modified web page.

7. The method of claim 2 wherein said executing comprises interpreting said request to determine a set of operations apply to the proxy browser to generate a next modified web page.

8. The method of claim 2 further comprising:
    scanning the content of said web page; and
    determining a next modified web page.

9. A computer program product comprising a non-transitory computer readable medium having a computer readable program, wherein said computer readable program when executed on a computer causes said computer to:
    embed a browser with script execution engine in a proxy server, thereby forming a proxy browser with script execution engine;
    use said proxy browser with script execution engine to execute a client application inside said proxy server;
    connect at least one client browser to said proxy server;
    assign each client browser that connects to said proxy server an instance of said proxy browser with script execution engine;
    maintain session information for said client browser; and
    if said client browser makes a request to said proxy server, link said request to said instance of said proxy browser with script execution engine;
    responsive to said proxy browser in said proxy server receiving a multistage purchase process from a business system on behalf of said client browser in a client device, said proxy browser not displaying the multistage purchase process to said client browser for a user, but said proxy browser only displaying changes that are needed in fields to said client browser in which said changes are said fields that said user needs to alter from purchase to purchase; and
    responsive to said proxy browser determining possible interaction paths t hat said user might take through said client application as inputs and responsive to said proxy browser determining possible outputs to said inputs, translating said request into simulated mouse events and simulated keyboard events by the proxy browser;
    wherein translating said request into said simulated mouse events and said simulated keyboard events by said proxy browser comprises said proxy browser clicking a link and pressing a submit button.

10. The computer program product of claim 9 wherein if said request is a first request by said client browser, said computer readable program further causes said computer to:
open a web page via said proxy browser with script execution engine;
execute said client application on said web page; and
return a portion of the contents of said page resulting from said executing to said client browser.

11. The computer program product of claim 10 wherein if said request is not a first request by said client browser, said computer readable program further causes said computer to translate said request into operations to perform on said web page.

* * * * *